Patented Jan. 30, 1945

2,368,565

UNITED STATES PATENT OFFICE 2,368,565

ZINC CALCIUM ARSENATE

George W. Pearce and Alfred W. Avens, Geneva, N. Y.

No Drawing. Original application June 18, 1940, Serial No. 341,179. Divided and this application August 9, 1943, Serial No. 497,970

1 Claim. (Cl. 23—53)

This is a division of application Serial No. 341,179 filed June 18, 1940, now Patent No. 2,344,895, granted March 21, 1944, for Basic calcium arsenate. The claims in that case are directed particularly to basic calcium arsenate; the claim in the present case is directed particularly to zinc calcium arsenate; and in a companion divisional application filed contemporaneously herewith the claims are directed to basic copper arsenate. The present invention relates to insecticides and fungicides of the arsenic type, and its principal object is broadly to provide a commercial method of producing arsenicals of definite chemical composition so as to have consistent and easily reproducible properties. Various specific objects will become apparent as the description proceeds. While arsenic has long been recognized as a useful economic poison, the chief problem in its use as an insecticide has been the difficulty in standardizing the commercial products employed, due to the fact that they generally involved mixtures of various arsenical compounds having different chemical and physical properties. While considerable improvements have been made in such commercial arsenicals, they have continued to produce inconsistent behavior with respect to insect toxicity and plant injury. The difficulty appears to be due to the fact that in most prior processes it was practically impossible to obtain anything but mixtures of two or more species of arsenates. These prior processes started with arsenic acids and generally ended up with mixtures, instead of a definite compound. The only important exception in the commercial insecticide field is di-lead arsenate, which is a compound of definite composition, generally produced from litharge and arsenic acid, using acetic acid as a catalyst. Lead however has many objectionable qualities, particularly where the production of food is concerned. Unfortunately, arsenates of other more desirable metals cannot be produced by the same type of reaction that produces di-lead arsenate.

By the invention described in the application of which this is a division it is possible to commercially produce a single definite species of calcium arsenate, namely basic calcium arsenate, and by the present invention it is possible to produce zinc calcium arsenate—though the processes are entirely different from the previous lead method above mentioned. The process differs fundamentally from the prior processes in that it uses dicalcium arsenate as the starting material, instead of arsenic acid. We will now describe specifically the use of dicalcium arsenate in the preparation of a zinc calcium arsenate suitable for use as an insecticide.

When arsenical sprays are used on plant foliage, arsenical injury to the foliage and the fruit frequently results. To avoid this difficulty, zinc, in the form of the powdered metal or certain of its compounds, has been used in the capacity of an arsenical injury preventive or corrective. The zinc-bearing material is commonly added to the spray mixtures in the spray tank as an individual substance, but in the present invention it is incorporated in the arsenical during manufacture. By treating dicalcium arsenate with a zinc bearing material in excess, the following simple procedure may be used to obtain a zinc-calcium arsenate of suitable properties for use as an insecticide.

Seven (7) parts of powdered dicalcium arsenate are intimately mixed with 2.75 parts of powdered zinc oxide (ZnO) in a ball-mill or other suitable mixing machine. The mixture is then autoclaved for two hours at 10–15 kilograms per square centimeter (140–210 lbs./sq. in.) steam pressure. The product is removed and submitted to a superficial grinding operation to put it in condition for use as an insecticide. The composition of the product is as follows:

| | Percent |
|---|---|
| Total arsenic, expressed as $As_2O_5$ | 42 |
| Total zinc, expressed as $ZnO$ | 33 |
| Total calcium, expressed as $CaO$ | 22 |

The water-soluble arsenic content will be about 0.30% expressed as $As_2O_5$.

The product formed in the above process represents a case where the zinc has been introduced to form a zinc calcium arsenate. In general when dicalcium arsenate is treated with metals or their oxides the primary reaction appears to be a displacement of the hydrogen and formation of a double salt such as calcium zinc arsenate, $Ca_2Zn(AsO_4)_2.XH_2O$. It is immaterial whether the metal or its oxide is used. For example, instead of using the oxide above described, zinc in the form of powdered metal may be employed, in the proportions of 155 parts of dicalcium arsenate to 48 parts zinc (powdered metal). The materials are intimately mixed and then autoclaved for 2 hours at 10–15 kgs. per sq. cm. (140–210 lbs. per sq. in.) steam pressure, in just the same manner as described above when zinc oxide was used. The reacting materials are added in excess over that required to displace all the hydrogen present in the dicalcium arsenate.

On the other hand, if dicalcium arsenate is treated with the sulfates, chlorides, nitrates, and other salts or compounds of the metal, the reactions may result in displacement of both the hydrogen and calcium present in dicalcium arsenate, resulting in the formation of an arsenate of the metal whose salt was used in the treatment.

It will be evident from the above that the use of dicalcium arsenate as the starting material in place of the usual arsenic bearing starting materials make possible the production of various arsenical preparations having consistent and easily reproducible chemical and physical properties. While dicalcium arsenate does not appear to be commercially available at the present time, it is easily and cheaply prepared on a commercial scale if desired by several methods, more or less well known, some of which are reviewed in the parent application of which this is a division, and it is not necessary to repeat them here. Moreover, since the anhydrous form ($CaHAsO_4$) of dicalcium arsenate as well as the completely dehydrated form known as calcium pyroarsenate ($Ca_2As_2O_7$) are readily returned to the monohydrated or othed hydrated forms of dicalcium arsenate, it will be understood that the process includes the use of these other forms for the manufacture of arsenicals. The arsenicals described are particularly useful in controlling insect pests of plants, but it will of course be understood that they may also be used for any other purposes to which they are suited.

While in the foregoing we have given a specific example of the type of process, it will be understood that it is merely by way of illustration to make clear the principles of the invention, which is not limited to the particular example shown, but is susceptible to various modifications and adaptations in different instances as will be apparent to those skilled in the art, without departing from the scope of the invention as stated in the following claim.

We claim:

The method of preparing zinc calcium arsenate, which consists in taking solid powdered dicalcium arsenate intimately mixed with solid powdered zinc or zinc oxide in excess and heat treating the mixture, whereby zinc calcium arsenate is formed.

GEORGE W. PEARCE.
ALFRED W. AVENS.